US008400447B1

(12) United States Patent  
Carr et al.

(10) Patent No.: US 8,400,447 B1  
(45) Date of Patent: Mar. 19, 2013

(54) SPACE PARTITIONING TREES USING PLANES SELECTED FROM A DISCRETE SET OF ORIENTATIONS

(75) Inventors: Nathan A. Carr, Santa Clara, CA (US); Gavin S. P. Miller, Los Altos, CA (US); Adam G. Kirk, Berkeley, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1432 days.

(21) Appl. No.: 12/032,335

(22) Filed: Feb. 15, 2008

(51) Int. Cl. *G06T 15/00* (2011.01)
(52) U.S. Cl. .................. 345/419; 345/420; 345/421
(58) Field of Classification Search .................. None
See application file for complete search history.

(56) References Cited

U.S. PATENT DOCUMENTS

2008/0192051 A1* 8/2008 Fowler et al. ................ 345/421

OTHER PUBLICATIONS

Ravi Kammaje and Benjamin Mora, "A Study of Restricted BSP Trees for Ray Tracing," IEEE/EG Symposium on Interactive Ray Tracing 2007, Sep. 2007, pp. 55-62.
Ingo Wald and Vlastiml Havran, "On building fast kd-trees forray tracing, and on doing that in O(N log N)," Proceedings ofthe 2006 IEEE Symposium on Interactive Ray Tracing, Sep. 2006, pp. 61-69.
Ingo Wald, Philipp Slusallek, Carsten Benthin, and Markus Wagner, "Interactive rending with coherent ray tracing," ComputerGraphics Forum/Proceedings of EUROGRAPHICS 2001, Sep. 2001, vol. 20, No. 3, pp. 153-164.
Ingo Wald, Solomon Boulos, and Peter Shirley, "Ray Tracing Deformable Scene using Dynamic Bounding Volume Hierarchies," ACM Transactions on Graphics, 2007, vol. 26, No. 1.
Vlastimil Harvan, Robert Herzog, and Hans-Peter Seidel, "On the Fast Construction of Spatial Hierarchies for Ray Tracing," Proceedings of RT06 Conference, Sep. 2006, pp. 71-80.
Andre Crosnier and Jarek Rossignac, "Tribox-based simplification of three-dimensional objects," Computers & Graphics, Mar. 1999, vol. 23, No. 3, pp. 429-437.
Gordon Müller, "Object Hierarchies for Efficient Rendering," Ph.D. thesis, Technical University Braunschweig, May 2004.
Warren Hunt, William Mark, and Gordon Stoll, "Fast kd-tree Construction with an Adaptive Error-Bounded Heuristic," 2006 IEEE Symposium on Interactive Ray Tracing, Sep. 2006.
Timothy Kay and James Kajiya, "Ray tracing complex scenes," SIGGRAPH '86: Proceedings of the 13th annual conference on Computer graphics and interactive techniques, 1986, pp. 269-278, vol. 20, No. 4, ACM Press, New York, NY.
James Klosowski, Martin Held, Joseph Mitchell, Henry Sowizral, and Karel Zikan, "Efficient collision detection using bonding colume hierarchies of k-dops," IEEE Transactions on Visualization and Computer Graphics, Jan.-Mar. 1998, vol. 4, No. 1, pp. 21-36.

(Continued)

*Primary Examiner* — Said Broome
(74) *Attorney, Agent, or Firm* — Wolfe-SBMC (57) ABSTRACT

A method, system, and computer-readable storage medium are disclosed for partitioning a scene with discrete oriented planes. In one embodiment, a scene comprising a plurality of objects may be partitioned into a plurality of sub-regions. The sub-regions may be divided by a plurality of planes having orientations selected from a discrete set of orientations comprising at least one orientation that is not the x axis, y axis, or z axis and is at a nonzero angle with respect to the x, y, or z axes. The partitioned scene may be stored in a binary tree comprising a plurality of nodes. Each node may correspond to a sub-region. In one embodiment, a ray tracing query may be solved for a particular ray. In solving the ray tracing query, the tree may be traversed to identify a first object of the plurality of objects intersected by the ray.

22 Claims, 6 Drawing Sheets

OTHER PUBLICATIONS

Beomseok Nam and Alan Sussman, "A comparative study of spatial indexing techniques for multidimensional scientific datasets," Scientific: and Statistical Database Management, 2004, pp. 171-180.

Alexander Reshetov, Alexei Soupikov, and Jim Hurley, "Multilevel Ray Tracing Algorithm," ACM Transactions on Graphics, 2005, vol. 24, No. 3, pp. 1176-1185.

Carsten Wächter and Andreas Keller, "Instant Ray Tracing: The Bounding Interval Hierarchy," Eurographics Symposium on Rendening, 2006.

Gabriel Zachmann, "Minimal Hierarchical Collision Detection," Proceedings of the ACM Symposium on Virtual Reality Software and Technology, Nov. 2002, pp. 121-128.

* cited by examiner

SPACE PARTITIONING TREES USING PLANES SELECTED FROM A DISCRETE SET OF ORIENTATIONS

BACKGROUND

1. Field of the Invention

The present invention is directed to computer systems; and more particularly, it is directed to the use of data structures to accelerate ray tracing computations using computer systems.

2. Description of the Related Art

As the power and complexity of personal computer systems increase, graphics operations are increasingly being performed using dedicated graphics rendering devices referred to as graphics processing units (GPUs). As used herein, the terms "graphics processing unit" and "graphics processor" are used interchangeably. GPUs are often used in removable graphics cards that are coupled to a motherboard via a standardized bus (e.g., AGP or PCI Express). GPUs may also be used in game consoles and in integrated graphics solutions (e.g., for use in some portable computers and lower-cost desktop computers). Although GPUs vary in their capabilities, they may typically be used to perform such tasks as rendering of two-dimensional (2D) graphical data, rendering of three-dimensional (3D) graphical data, accelerated rendering of graphical user interface (GUI) display elements, and digital video playback. A GPU may include various built-in and configurable structures for rendering digital images to an imaging device. Digital images may include raster graphics, vector graphics, or a combination thereof. A GPU may include facilities for parallel processing of appropriate data sets. A GPU may implement one or more application programmer interfaces (APIs) that permit programmers to invoke the functionality of the GPU.

In addition to GPUs, multi-core processors and multi-processor computer systems may offer additional platforms for parallel computation of graphics-related data. Accordingly, it is desirable to use algorithms that can scale in a parallel processing environment. Ray tracing is a popular graphics algorithm that has been shown to scale nearly linearly with the number of available processors or cores. However, ray tracing has seen limited use in the interactive space. Current GPU rendering algorithms may adeptly handle basic rendering effects such as shadowing. These algorithms, however, are typically linear in the geometry complexity of the scene. Thus, as the geometry of a scene becomes more complicated and as more realistic effects become desired, ray tracing becomes a more valuable approach.

A ray tracing algorithm may use a spatial database to store objects in a three-dimensional scene. Typically, this data structure is optimized for performing a ray tracing query: that is, given a ray in space, what is the first object that the ray intersects? A simplistic implementation of such a database may yield O(n) performance per database query, where n is the number of object in the scene. However, by clustering nearby objects together and bounding the region of space that they occupy, simple tests may cull away large amounts of geometry. By building hierarchies of these bounded regions in space, the overall running time for performing a query may be reduced (e.g., to approximately $O(\log_2 n)$ for typical scenes). Spatial database structures usable for ray tracing can be broken down into two primary categories: spatial partitioning methods and bounding volume methods.

A spatial partitioning scheme partitions space into disjoint regions, usually by choosing a plane at each subdivision level that splits the current region into two sub-regions. In the category of spatial partitioning methods, the kd-tree is one of the most popular and efficient structures for ray tracing on the CPU. In the context of ray tracing, the chosen splitting planes are aligned along the x, y, or z coordinate axis (i.e., axis-aligned). A kd-tree has three major benefits in the context of ray tracing. First, the storage per split is small and requires only a specified axis (i.e., the x, y, or z axis, typically expressed in 2 bits) and a location along the axis (typically expressed in a single floating point value). Second, traversal may be relatively fast because only ray-plane intersection against axis-aligned planes is determined. Finally, tree constructions may be relatively simple because only three splitting axes are involved.

A spatial partitioning scheme using arbitrary placement of splitting planes in space may be implemented with BSP-trees (binary space partitioning trees). However, a BSP tree typically requires more data to be stored at each partition (e.g., a plane expressed as four floating point values). Thus, the BSP-tree may be four times as costly as a kd-tree in its use of storage and bandwidth. Additionally, traversal is expensive because a division operation must be performed to intersect a ray with an arbitrary plane. Finally, the process of building a BSP-tree may be more complex because a larger degree of freedom is permitted in choosing the locations of splitting planes.

Bounding volume methods may break space into sub-regions which may or may not overlap in space. A simple example of such a scheme uses hierarchies of axis-aligned bounding boxes (AABBs) or spheres to bound the geometry in a scene. An AABB stores minimum and maximum bounds along three coordinate axes (x, y, and z). Because bounding boxes and spheres are limited in how tightly they bound geometry, hierarchies of structures called k-dops (k-discrete oriented polytopes) have been used to bound geometry. A k-dop is a generalization of an AABB. However, a k-dop may require a large amount of storage. Furthermore, each split may be relatively costly because it requires storing two entirely new bounding volumes.

Recently, incremental bounding volume hierarchy structures such as box trees, SKD-trees, and BIH-trees have been proposed. To avoid storing an entirely new bounding volume at each node, child bounding volumes are incremental updates to their parent bounding volume along a given axis. Thus, a split of a parent volume involves choosing an axis along which to split and choosing two locations along this axis. In contrast to a kd-tree, the choice of two planes allows the two children to overlap in space. In this manner, triangles do not need to be split or clipped against a splitting plane as is done in the construction of an efficient kd-tree. Additionally, triangles need not be stored in multiple locations in the tree, thereby reducing memory overhead. However, traversal (e.g., for a ray tracing query) does not terminate at the first triangle intersection in a node. If the intersection point occurs in the overlap region, the right child of the parent should also be checked for intersection. While traversal is slower, however, building the tree is faster. Therefore, bounding interval hierarchies may be appropriate for situations (e.g., dynamic scenes) in which performance is primarily a function of tree construction and ray intersection.

SUMMARY

Various embodiments of systems, methods, and computer-readable storage media for partitioning a scene using planes selected from a discrete set of orientations are disclosed. In one embodiment, a scene comprising a plurality of objects may be partitioned into a plurality of sub-regions. The sub-regions may be divided from each other by a plurality of planes having orientations selected from a discrete set of orientations. In one embodiment, the discrete set of orientations is a countable set that comprises at least one orientation that is not the x axis, the y axis, or the z axis and is at a nonzero angle with respect to the x axis, the y axis, or the z axis. The planes selected from the discrete set of orientations may comprise planes aligned to the x axis, planes aligned to the y axis, planes aligned to the z axis, and/or other planes oriented at a fixed angle (e.g., 45 degrees) with respect to the x axis, y axis, or z axis. In one embodiment, the sub-regions may be either disjoint or overlapping.

In one embodiment, the partitioned scene may be stored in a binary tree comprising a plurality of nodes. Each node may correspond to one of the plurality of sub-regions encompassing at least one object in the scene. In one embodiment, a ray tracing query may be solved for a particular ray. In solving the ray tracing query, the tree may be traversed to identify a first object of the plurality of objects intersected by the ray.

In one embodiment, the number and/or orientation of planes selected from the discrete set of orientations may vary from scene to scene. In one embodiment, the choice of planes may be determined by analyzing the distribution of normals in the scene. In one embodiment, values that may be needed in the traversal routine may be pre-computed prior to beginning the traversal. For example, one or more tables may be pre-computed for each ray, where the tables include a plurality of values usable in mathematical operations that may be performed during the traversal of the tree. In solving the ray tracing query, the pre-computed values may be used. For example, rather than performing a costly division operation, a multiplication operation using a pre-computed reciprocal value may be performed during traversal.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION OF EMBODIMENTS

Using embodiments of the systems and methods described herein, ray tracing computations (e.g., ray tracing queries) used in the rendering of three-dimensional (3D) graphics may be accelerated through the use of a data structure referred to herein as a kp-tree. As will be discussed in greater detail below, a kp-tree is a data structure that partitions objects in a scene (e.g., a 3D scene) into regions. The kp-tree may therefore comprise a spatial database of the objects in the scene. At each subdivision level, a plane may be selected that splits the current region into two sub-regions. The two new sub-regions may be placed in child nodes of the parent node (i.e., representing the current region) in a binary tree. In one embodiment, the splitting planes in the kp-tree may comprise planes having orientations selected from a discrete set of orientations. The planes selected from the discrete set of orientations may be referred to herein as "discrete oriented planes." Embodiments of the systems and methods described herein may be implemented using suitable computing hardware such as a central processing unit (CPU) and/or graphics processing unit (GPU). The performance of ray tracing computations using a kp-tree may be improved by using a CPU and/or GPU that includes facilities for parallel processing.

Figure 1:
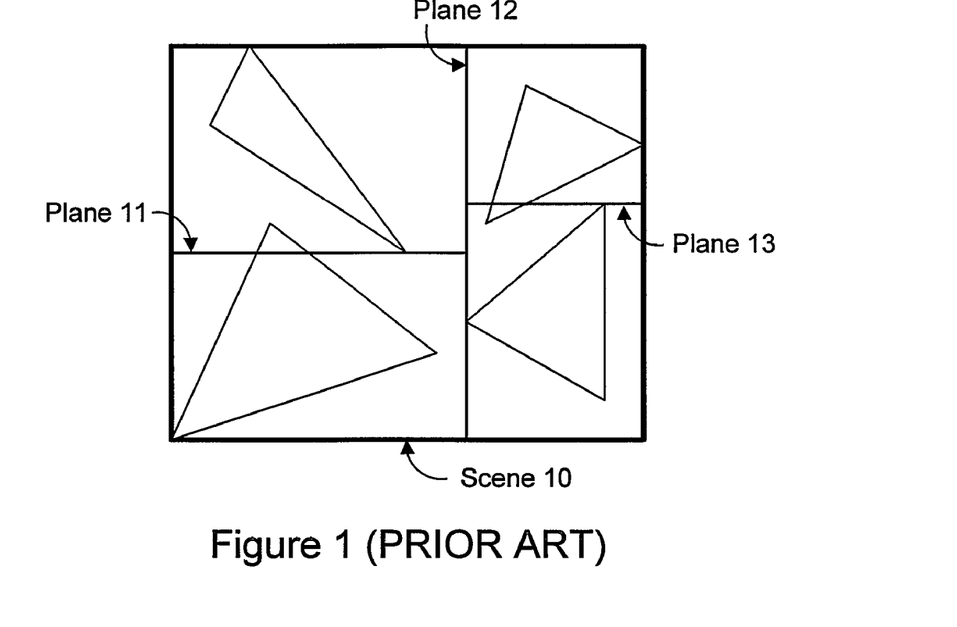
FIG. 1 illustrates an example of a scene partitioned using a kd-tree.
Figure 2:
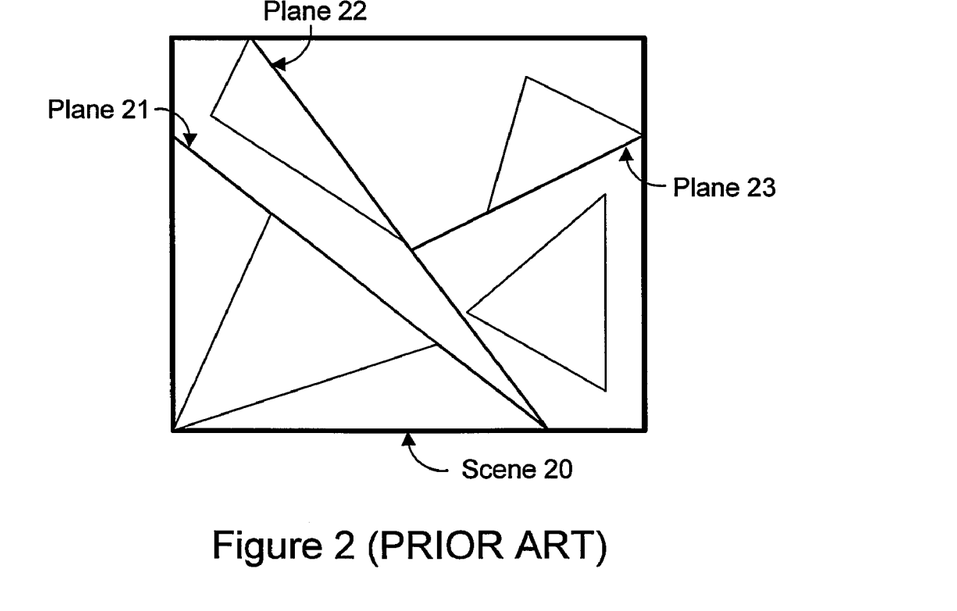
FIG. 2 illustrates an example of a scene partitioned using a BSP-tree.

FIG. 1 illustrates an example of a scene 10 partitioned using a kd-tree. For purposes of illustration, a two-dimensional view of the scene 10 is shown. Each of the three splitting planes 11, 12, and 13 may be aligned along the x, y, or z axis. In a kd-tree, an object may be referenced in multiple boxes at the same level of the hierarchy (e.g., if the object straddles a splitting plane). FIG. 2 illustrates an example of a similar scene 20 partitioned using a BSP-tree. For purposes of illustration, a two-dimensional view of the scene 20 is shown. Each of the three splitting planes 21, 22, and 23 may be arbitrarily located in space with respect to the x, y, and z axes. Although it is less likely that an object may straddle a splitting plane in a BSP-tree in comparison to a kd-tree, the BSP-tree has greater storage requirements per node.

In comparison to a kd-tree, a kp-tree (i.e., a k-planes tree) may be used to tighten the bounding regions around objects and thus improve the pruning efficiency of a spatial database. Instead of splitting the sub-regions only on axis aligned dimensions, as in kd-trees, the available choices may be increased by introducing k planes available for splitting. For example, a particular kp-tree may use a set of splitting planes including planes aligned to the x axis, planes aligned to the y axis, planes aligned to the z axis, and various planes at 45 degrees to the x, y, or z axis. Increasing the available choices for splitting planes may provide a tighter fit around objects, such that ray-triangle intersections in leaf nodes are more likely to record a hit in a ray tracing query.

In one embodiment, a kp-tree may comprise a spatial database that partitions objects in a scene (e.g., a 3D scene) into disjoint regions using a spatial partitioning scheme. A kp-tree may therefore comprise a modified kd-tree. In one embodiment, a kp-tree may comprise a spatial database that partitions objects in a scene (e.g., a 3D scene) into sub-regions using a bounding volume scheme such that the sub-regions may or may not overlap in space. A kp-tree may therefore comprise a modified bounding volume hierarchy structure such as a modified SKD-tree or a modified BIH-tree. Like an unmodified kd-tree, an unmodified BIH-tree may use axis-aligned splitting planes to partition space. An advantage of choosing axis-aligned planes is that both traversal computation and tree node storage may be kept to a minimum.

Figure 3:
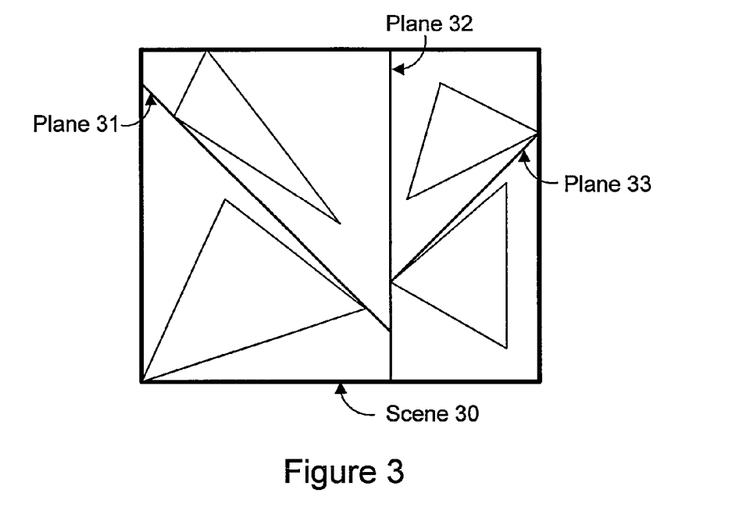
FIG. 3 illustrates an example of a scene partitioned using a kp-tree according to one embodiment.

FIG. 3 illustrates a scene 30 partitioned using a kp-tree according to one embodiment. The scene 30 may be located in three-dimensional space including a z axis. For purposes of illustration, however, a two-dimensional section of the scene 30 is shown. Each of the three splitting planes 31, 32, and 33 may be aligned along the x, y, or z axis (e.g., as in a kd-tree) or may comprise another discrete oriented plane. In the example scene 30, two splitting planes 31 and 33 are aligned at 45 degrees with respect to the x or y axis while another splitting plane 32 is axis-aligned.

Figure 4:
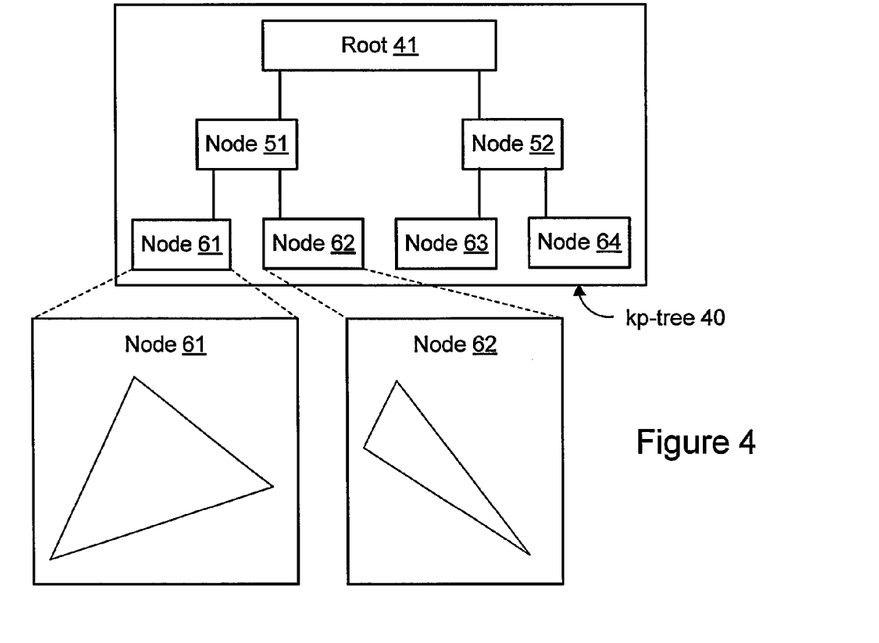
FIG. 4 illustrates the structure of a kp-tree according to one embodiment.

FIG. 4 illustrates the structure of an example kp-tree 40 capturing the example scene 30 according to one embodiment. A root node 41 may conceptually represent the entire scene 30. Upon determining a first splitting plane (e.g., plane 32), two child nodes 51 and 52 may be generated. The objects represented in node 51 may be subdivided by the selection of the splitting plane 31 to generate two child nodes 61 and 62. The objects represented in node 52 may be subdivided by the selection of the splitting plane 33 to generate two child nodes 63 and 64.

Each internal node of a kd-tree may comprise a splitting plane location s, a splitting axis a (e.g., 0, 1, or 2 representing x, y, or z), a flag denoting that the node is internal to the kd-tree (i.e., not a leaf), and a pointer to the two children (which may be allocated consecutively in memory). The splitting plane may be stored as a 32-bit value. The split axis and flags may use two bits, and the offset may use thirty bits. Thus, all the items represented within the internal node may be packed into 64 bits. In one embodiment, nodes in a kd-tree may be aligned on four byte boundaries. The offset to the children may comprise a pointer, and the flags may be stored in the lower bits of the pointer (which would otherwise be zero due to alignment). Although a BSP-tree permits tighter boundaries and more efficient pruning, the BSP-tree has much larger storage requirements per node than a kd-tree: e.g., a normal and offset or four coordinates and a pointer to define a plane in three dimensions.

In one embodiment, each internal (i.e., non-leaf) node in a kp-tree may store data similar to the contents of the kd-tree node described above: for example, a splitting plane location s, a splitting axis a (e.g., a 4-bit value representing one of the available splitting plane orientations), a flag denoting that the node is internal to the kp-tree (i.e., not a leaf), and an offset to the two children (which may be allocated consecutively in memory). A leaf node may omit the flag and the offset to the children. In comparing the kp-tree to the kd-tree, more bits (e.g., 4) may be dedicated to describing the axis of the splitting plane in the kp-tree. To keep each node of the kp-tree within a 64-bit value, a 28-bit offset to the children may be used instead of a pointer to the children. In one embodiment, the bits allocated to representing the splitting axis may be increased (e.g., more than 4 bits) while the bits allocated to the offset may be decreased accordingly.

In rendering a scene using ray tracing, the kp-tree may permit the answer to a ray tracing query to be answered efficiently: given a ray in space, what is the first object that the ray intersects? The kp-tree may be traversed until such an object is found. Traversal may comprise recursively testing nodes to prune away large sections of the geometry of the scene. The primary traversal computation is to find the parametric distance where the ray pierces the splitting plane. The ray may be represented by an origin point O and a direction D that need not be normalized. Any point P along this ray will satisfy the equation P=O+Dt. Given some plane in space defined by normal N and offset s, the intersection of the ray with this plane may be found as follows:

$$0 = N \cdot (P) - s$$

$$0 = N \cdot (O+Dt) - s$$

$$t = (s - N \cdot O)/(N \cdot D) \quad (1)$$

If the plane is axis-aligned, then equation (1) can be expressed as follows, where a is the x, y, or z axis and s is the location of the splitting plane:

$$t = (s - N \cdot O[a])/(D[a]) \quad (2)$$

In one embodiment, the computational expense of traversal may be reduced significantly by pre-computing values such as 1/D.x, 1/D.y, and 1/D.z to avoid costly division operations in evaluating equation (2) during traversal of the kp-tree. In one embodiment, an axis-aligned traversal process, including the pre-computation, may be performed according to the following pseudo-code:

```
<precompute RD=1/D>
while (stack is not empty){
while (!isLeaf(pNode))
{
   int axis=AXIS(pNode);
   float t=(SPLIT(pNode)-O[axis])*RD[axis];
   pNearChild=pNode→children ( );
   pFarChild=pNearChild+1;
   if(D[axis]<0)
      swap (pNearChild, pFarChild);
   pNode=pNearChild;
   if(t<=mint){
      pNode=pFarChild;
   }
   else if(t>maxT){
      <push far child on stack>
   }
}
<handle leaf>
<pop stack>
}
```

In a tree (e.g., a BSP tree) with conventional arbitrarily oriented splitting planes, equation (1) (including its costly inner product) would be evaluated during traversal. The performance implications of increased traversal cost and increased node storage reduces the benefits of permitting arbitrary splitting planes (e.g., in a BSP tree).

Instead of using arbitrary splitting planes, a set of planes selected from a discrete set of orientations (i.e., a set of discrete oriented planes) may be used to produce a spatial database (i.e., a kp-tree) for ray tracing queries that is efficient in both traversal cost and node storage. A small number (k) of orientations in the discrete set may be selected. For each orientation in the discrete set, $NO = N \cdot O$ and $RND = 1/(N \cdot D)$ may be computed upon entry to the ray traversal routine. Thus, a table may be pre-computed for each ray. In one embodiment, equation (1) may now be evaluated as follows, where NO is the pre-computed inner product between the various normals and the ray origin, and RND is the pre-computed reciprocal of the inner product between the planes and the distance vector:

$$t = (s - NO[a]) * RND[a] \quad (3)$$

After the pre-computation, the evaluation of equation (3) for a kp-tree may have approximately the same cost as the evaluation of equation (2) for a spatial database with axis-aligned planes. In one embodiment, another table may be pre-computed to determine the order of traversal. In the case of axis-aligned splitting planes, the ray direction signs are typically checked to determine the order in which child nodes are visited. For example, if the x component of a ray direction is positive, then the near child is visited before the far child. In the discrete orientation case, the traversal order for each plane may be pre-computed in the lookup table TO. Thus, in exchange for slightly higher pre-computation for each ray, the parametric intersection value for a discrete set of planes may be determined more efficiently in the traversal routine. In one embodiment, a traversal process for a data structure (e.g., a kp-tree) partitioned with a discrete set of planes, including the pre-computation, may be performed according to the following pseudo-code:

```
<precompute tables NO, RND, and TO>
while (stack is not empty){
  while (!isLeaf(pNode))
  {
    int axis=AXIS(pNode);
    float t=(SPLIT(pNode)-NO[axis])*RND[axis];
    pNearChild=pNode->children ( );
    pFarChild=pNearChild+1;
    if(TO[axis])
      swap (pNearChild, pFarChild);
    pNode=pNearChild;
    if(t<=minT){
      pNode=pFarChild;
    }
    else if(t>maxT){
      <push far child on stack>
    }
  }
  <handle leaf>
  <pop stack>
}
```

In one embodiment, a set of discrete oriented planes may also be used to augment BIH-trees, SKD-trees, or other bounding interval hierarchies. Unlike a kd-tree, each node of a BIH-tree or SKD-tree stores two axis-aligned splitting planes. As discussed above, however, adding a set of discrete oriented planes may change the amount of pre-computation for each ray while leaving the cost of traversal approximately the same as traversal of an unmodified BIH-tree or SKD-tree. In one embodiment, a traversal process for a bounding interval hierarchy partitioned with a set of discrete oriented planes, including pre-computation, may be performed according to the following pseudo-code:

```
< precompute tables NO, RND, and TO >
while ( stack is not empty ){
  while ( pNode && !isLeaf(pNode) )
  {
    int axis = AXIS(pNode);
    float t0 = (SPLIT0(pNode)-NO[axis])*RND[axis];
    float t1 =
        (SPLIT1(pNode)-NO[axis])*RND[axis];
    pNearChild = pNode -> children( );
    pFarChild = pNearChild+1;
    if( TO[axis] ){
      swap (pNearChild, pFarChild);
      swap (t0, t1);
    }
    if( t1 < maxT ){
      pNode = pFarChild;
      if( t0 > tmin ){
        <push far child on stack>
        pNode = pNearChild;
      }
    }
```

```
    else {
      pNode = 0;
      if( t0 > tmin )
        pNode = pNearChild;
    }
  }
  <handle leaf>
  <pop stack>
}
```

Figure 5:
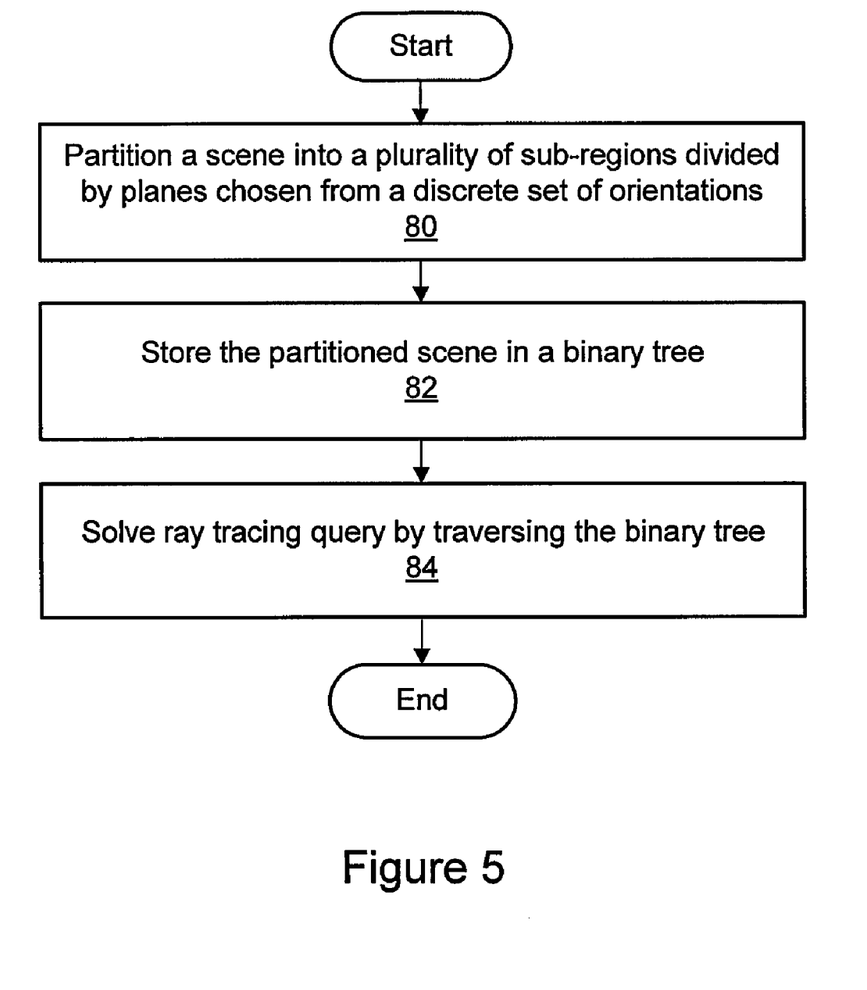
FIG. 5 is a flow diagram illustrating a method for ray tracing of a scene partitioned with planes selected from a discrete set of orientations according to one embodiment.

FIG. 5 is a flow diagram illustrating a method for ray tracing of a scene partitioned with planes selected from a discrete set of orientations according to one embodiment. As shown in block 80, a scene comprising a plurality of objects may be partitioned into a plurality of sub-regions. The sub-regions may be divided from each other by a plurality of planes selected from a discrete set of orientations. In one embodiment, the discrete set of orientations is a countable set that comprises at least one orientation that is not the x axis, the y axis, or the z axis and is at a nonzero angle with respect to the x axis, the y axis, or the z axis. The planes selected from a discrete set of orientations may comprise planes aligned to the x axis, planes aligned to the y axis, planes aligned to the z axis, and/or other planes oriented at one or more fixed angles (e.g., 45 degrees) with respect to the x axis, y axis, or z axis. In one embodiment, the sub-regions may be either disjoint or overlapping.

In constructing a kp-tree to partition a scene, any suitable technique for subdividing the objects in the scene may be used. Subdividing the scene at each level of the hierarchy of the kp-tree may comprise selecting one of the discrete oriented planes and dividing the region or sub-region using the selected plane. In one embodiment, the surface area heuristic may be used to determine the cost of a split at a given location based on the surface area of the bounding shapes. The plane may be placed at the location where the surface area heuristic evaluates to a minimum.

As shown in block 82, the partitioned scene may be stored in a binary tree comprising a plurality of nodes. Each node may correspond to one of the plurality of sub-regions encompassing at least one object in the scene. As shown in block 84, a ray tracing query may be solved for a particular ray. In solving the ray tracing query, the tree may be traversed to identify a first object of the plurality of objects intersected by the ray. Additional ray tracing queries may be solved for additional rays to render the entire scene. In one embodiment, the scene may then be displayed on a display device using appropriate graphics hardware.

Figure 6:
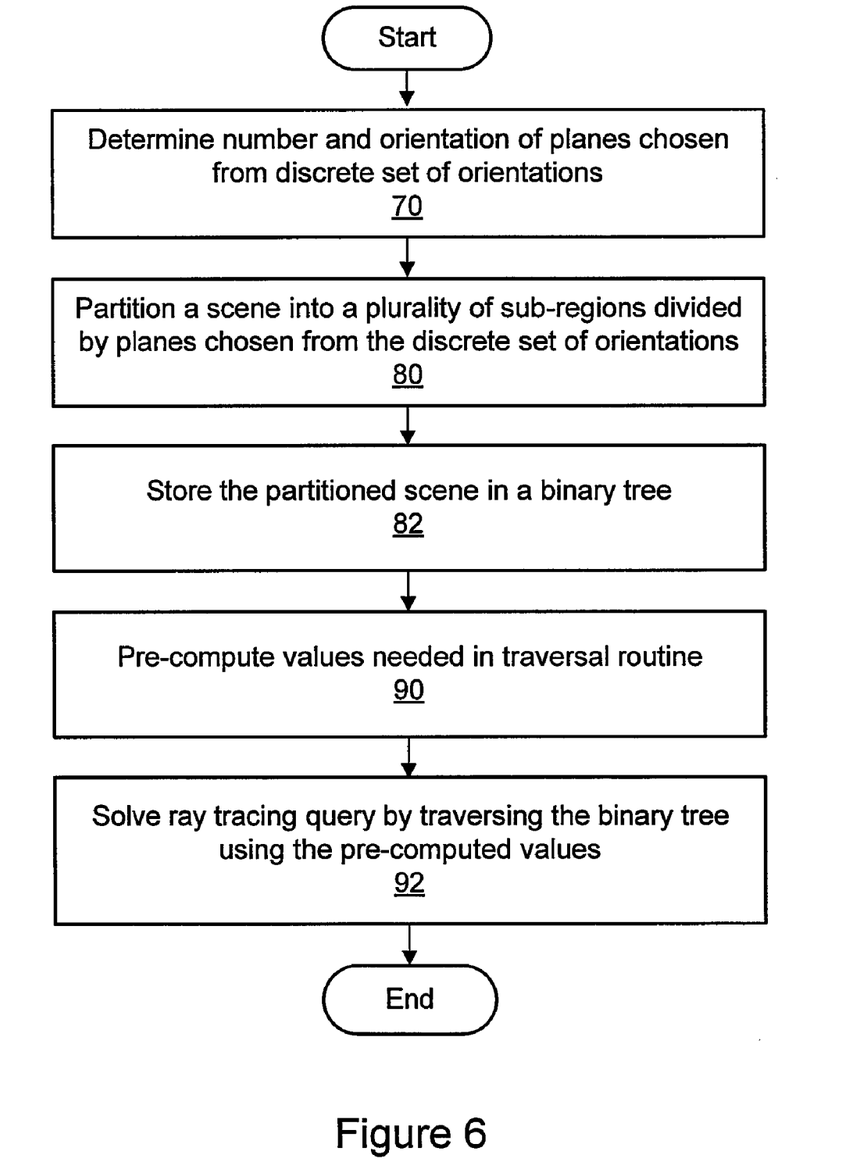
FIG. 6 is a flow diagram illustrating a method for ray tracing of a scene partitioned with planes selected from a discrete set of orientations according to one embodiment.

FIG. 6 is a flow diagram illustrating a method for ray tracing of a scene partitioned with planes selected from a discrete set of orientations according to one embodiment. As shown in block 70, the number and orientation of planes selected from a discrete set of orientations may be determined. The number (k) of orientations in the discrete set of orientations may vary. The orientation of the planes may also vary. In one embodiment, the orientations in the set may be selected to fit the needs of a particular scene. For example, if a scene comprises a model of a city whose buildings sit on a regular grid but oriented at a 35 degree angle, an ideal set of orientations might include this 35 degree angle such that the planes of the kp-tree have a tighter fit with the geometry. In one embodiment, the choice of orientations may be influenced by the distribution of normals in the scene. By analyzing the distribution of normals, a set of orientations that better divide the space may be selected. In one embodiment, k-means clustering may be performed on the normals, where k is the desired number of orientations available for splitting planes in the kp-tree. In one embodiment, spectral analysis may be used to analyze the normals. For example, a 3×3 covariance matrix may be built from the normals, and the eigen-vectors of the matrix may be computed to derive the dominant normal directions for the scene.

As shown in block 80, as discussed above, the scene may be partitioned into a plurality of sub-regions. The sub-regions may be divided from each other by a plurality of planes selected from a discrete set of orientations. In one embodiment, the discrete set of orientations is a countable set that comprises at least one orientation that is not the x axis, the y axis, or the z axis and is at a nonzero angle with respect to the x axis, the y axis, or the z axis. For example, the discrete oriented planes may comprise planes aligned to the x axis, planes aligned to the y axis, planes aligned to the z axis, and/or other planes oriented at one or more fixed angles (e.g., 45 degrees) with respect to the x axis, y axis, or z axis. In one embodiment, the sub-regions may be either disjoint or overlapping. As shown in block 82, as discussed above, the partitioned scene may be stored in a binary tree comprising a plurality of nodes. Each node may correspond to one of the plurality of sub-regions encompassing at least one object in the scene.

As shown in block 90, values that may be needed in the traversal routine may be pre-computed prior to beginning the traversal. For example, one or more tables may be pre-computed for each ray, where the tables include a plurality of values usable in mathematical operations that may be performed during the traversal of the tree. A table NO may comprise the pre-computed inner product between the various normals and the ray origin. A table RND may comprise the pre-computed reciprocal of the inner product between the planes and the distance vector. A table TO may comprise the traversal order for each plane.

As shown in block 92, a ray tracing query may be solved for a particular ray, including using the pre-computed values. For example, rather than performing a costly division operation, a multiplication operation using a pre-computed reciprocal value may be performed. In solving the ray tracing query, the tree may be traversed to identify a first object of the plurality of objects intersected by the ray. Additional ray tracing queries may be solved for additional rays to render the entire scene. In one embodiment, the scene may then be displayed on a display device using appropriate graphics hardware.

Figure 7:
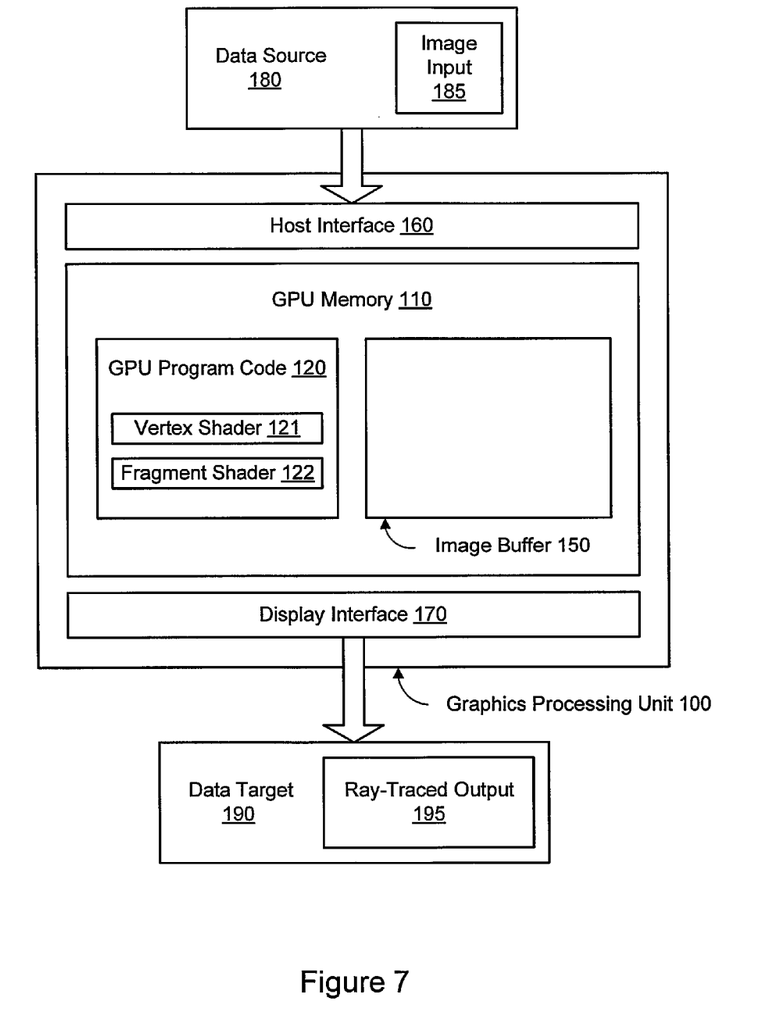
FIG. 7 is a diagram illustrating one embodiment of a graphics processing unit (GPU) configured for ray tracing of a scene partitioned with planes selected from a discrete set of orientations.
Figure 8:
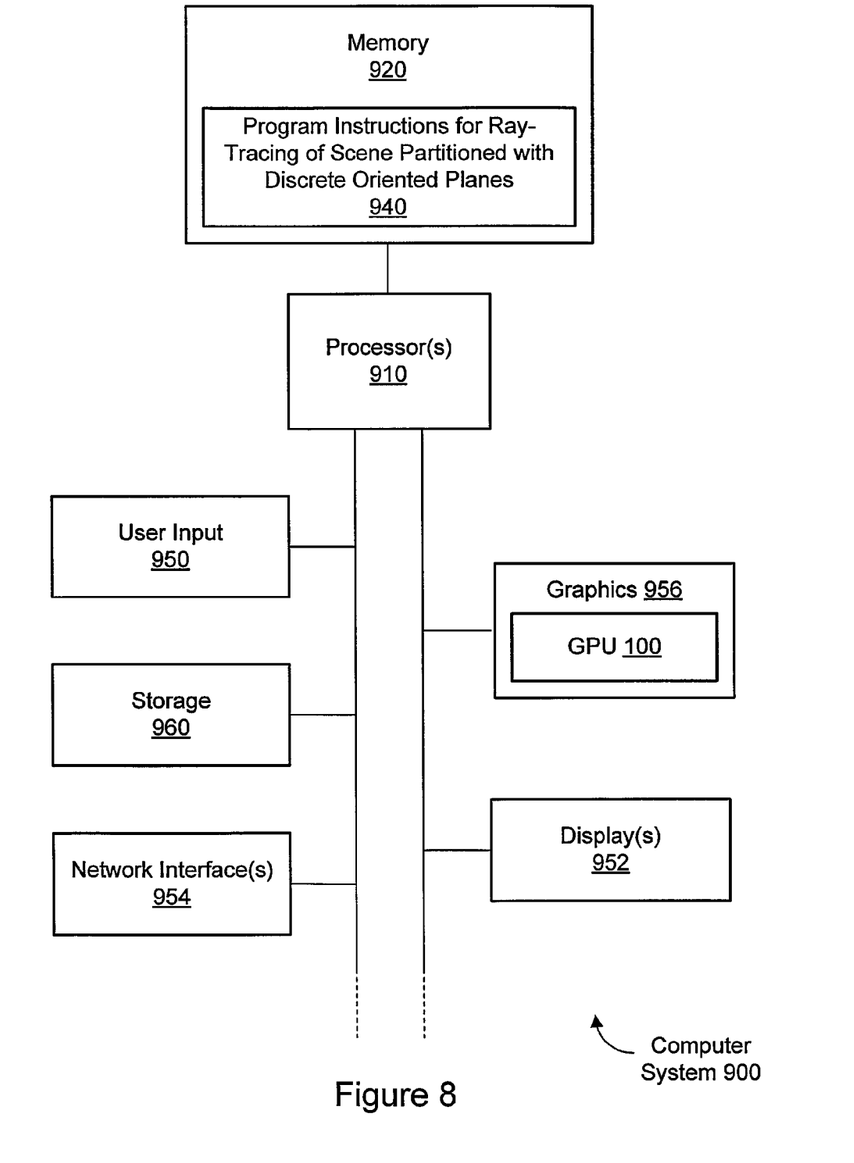
FIG. 8 is a diagram illustrating constituent elements of a computer system that is configured to implement embodiments of the system and method for ray tracing with a scene partitioned with planes selected from a discrete set of orientations.

FIG. 7 is a diagram illustrating one embodiment of a graphics processing unit (GPU) configured for ray tracing of a scene partitioned with planes selected from a discrete set of orientations. The GPU 100, also referred to herein as a graphics processor, may comprise a dedicated graphics rendering device associated with a computer system. An example of a suitable computer system 900 for use with the GPU 100 is illustrated in FIG. 8. Turning back to FIG. 7, the GPU 100 may include numerous specialized components configured to optimize the speed of rendering graphics output. For example, the GPU 100 may include specialized components for rendering three-dimensional models, for applying textures to surfaces, etc. For the sake of illustration, however, only a limited selection of components is shown in the example GPU 100 of FIG. 7. It is contemplated that GPU architectures other than the example architecture of FIG. 7 may be suitable for implementing the techniques described herein. The GPU 100 may implement one or more application programmer interfaces (APIs) that permit programmers to invoke the functionality of the GPU. Suitable GPUs may be commercially available from vendors such as NVIDIA Corporation, ATI Technologies, and others.

The GPU 100 may include a host interface 160 configured to communicate with a data source 180 (e.g., a communications bus and/or processor(s) 910 of a host computer system 900 or the host system itself). For example, the data source 180 may provide image input data 185 (e.g., a scene comprising a plurality of objects in three-dimensional space) and/or executable program code to the GPU 100. In some embodiments, the host interface 160 may permit the movement of data in both directions between the GPU 100 and the data source 180. The GPU 100 may also include a display interface 170 for providing output data to a data target 190. For example, the data target 190 may comprise a display device 952, and the GPU 100 (along with other graphics components and/or interfaces 956) may "drive" the display 952 by providing graphics data, such as a ray traced scene, at a particular rate from a screen buffer (e.g., the image buffer 150).

In one embodiment, the GPU 100 may include internal memory 110. The GPU memory 110, also referred to herein as "video memory" or "VRAM," may comprise random-access memory (RAM) which is accessible to other GPU components. As will be described in greater detail below, the GPU memory 110 may be used in some embodiments to store various types of data and instructions such as input data, output data, intermediate data, program instructions for performing various tasks, etc. In one embodiment, the GPU 100 may also be configured to access memory 920 of a host computer system 900 via the host interface 160.

In one embodiment, program instructions 940 may be stored in the memory 920 of the host computer system 900 and executed by the host computer system 900 to generate rendered image output 195 based on the image input 185. In one embodiment, the image input 185 may include a scene comprising one or more geometric objects in three-dimensional space (e.g., as vertices and associated data in a tessellation), and ray tracing operations may be performed on the GPU 100. In one embodiment, ray tracing operations may largely be performed using one or more processors of the host computer system, and elements of the ray traced scene may be provided to the GPU 100. In one embodiment, the image output 195 may include ray traced output generated according to the techniques described herein.

In one embodiment, the GPU 100 may include GPU program code 120 that is executable by the GPU 100 to perform aspects of the techniques discussed herein. For example, geometric objects in the image input 185 may be rasterized to pixels by a rasterizer during a rendering process including execution of the GPU program code 120 on the GPU 100. Elements of the GPU program code 120 may be provided to the GPU 100 by a host computer system (e.g., the data source 180) and/or native to the GPU 100. In one embodiment, the GPU program code 120 may comprise a vertex shader 121. A vertex shader 121 comprises program instructions that are executable by the GPU 100 to determine properties (e.g., position) of a particular vertex. A vertex shader may expect input such as uniform variables (e.g., constant values for each invocation of the vertex shader) and vertex attributes (e.g., per-vertex data). In one embodiment, the GPU program code 120 may comprise a fragment shader 122. The fragment shader 122 may also be referred to as a pixel shader 122. The fragment shader 122 comprises program instructions that are executable by the GPU 100 to determine properties (e.g., color) of a particular pixel. A fragment shader may expect input such as uniform variables (e.g., constant values for each invocation of the fragment shader) and pixel attributes (e.g., per-pixel data). In generating the rendered image output 195, both the vertex shader 121 and the fragment shader 122 may be executed at various points in the graphics pipeline.

The GPU memory 100 may comprise one or more buffers, and each buffer may comprise a two-dimensional array of pixel data (e.g., color values) and/or pixel metadata (e.g., depth values, stencil values, etc.). As illustrated in FIG. 7, for example, the GPU memory 110 may comprise an image buffer 150. The image buffer 150 may store intermediate or final pixel values generated in the rendering process. In one embodiment, the image buffer 150 may comprise a single-sampling buffer wherein each pixel in the buffer is represented by a single set of color and alpha values (e.g., one color value for a red channel, one color value for a green channel, one color value for a blue channel, and appropriate values for a one or more alpha channels). In another embodiment, the image buffer 150 may comprise a multi-sampling buffer usable for automatic anti-aliasing.

FIG. 8 is a diagram illustrating constituent elements of a computer system 900 that is configured to implement embodiments of the system and method for ray tracing with a scene partitioned with discrete oriented planes. The computer system 900 may include one or more processors 910 implemented using any desired architecture or chip set, such as the SPARC™ architecture, an x86-compatible architecture from Intel Corporation or Advanced Micro Devices, or an other architecture or chipset capable of processing data. Each of the one or more processors 910 may include one or more cores. Any desired operating system(s) may be run on the computer system 900, such as various versions of Unix, Linux, Windows® from Microsoft Corporation, Mac OS® from Apple Inc., or any other operating system that enables the operation of software on a hardware platform. The processor(s) 910 may be coupled to one or more of the other illustrated components, such as a memory 920, by at least one communications bus.

In one embodiment, a specialized graphics card or other graphics component 956 may be coupled to the processor(s) 910. The graphics component 956 may include a GPU such as the GPU 100 illustrated in FIG. 7. Additionally, the computer system 900 may include one or more imaging devices 952. The one or more imaging devices 952 may include various types of raster-based imaging devices such as monitors and printers. In one embodiment, the one or more imaging devices 952 may comprise one or more display devices 952 that are coupled to the graphics component 956 for display of data provided by the graphics component 956.

In one embodiment, program instructions 940 that may be executable by the processor(s) 910 to implement aspects of the ray tracing and/or partitioning techniques described herein may be partly or fully resident within the memory 920 at the computer system 900 at any point in time. The memory 920 may be implemented using any appropriate computer-readable memory medium such as any of various types of ROM or RAM (e.g., DRAM, SDRAM, RDRAM, SRAM, etc.), or combinations thereof. The program instructions may also be stored on a computer-readable storage device or media 960 accessible from the processor(s) 910. Any of a variety of storage devices or media 960 may be used to store the program instructions 940 in different embodiments, including any desired type of persistent and/or volatile storage devices, such as individual disks, disk arrays, optical devices and associated media (e.g., CD-ROMs, CD-RW drives, DVD-ROMs, DVD-RW drives), flash memory devices, various types of RAM, holographic storage, etc. The storage 960 may be coupled to the processor(s) 910 through one or more storage or I/O interfaces. In some embodiments, the program instructions 940 may be provided to the computer system 900 via any suitable computer-readable storage medium including the memory 920 and storage devices 960 described above.

The computer system 900 may also include one or more additional I/O interfaces, such as interfaces for one or more user input devices 950. In addition, the computer system 900 may include one or more network interfaces 954 providing access to a network. It should be noted that one or more components of the computer system 900 may be located remotely and accessed via the network. The program instructions may be implemented in various embodiments using any desired programming language, scripting language, or combination of programming languages and/or scripting languages, e.g., C, C++, C#, Java™, Perl, etc. It will be apparent to those having ordinary skill in the art that computer system 900 can also include numerous elements not shown in FIG. 8, as illustrated by the ellipsis shown.

In various embodiments, the elements shown in FIGS. 5 and 6 may be performed in a different order than the illustrated order. In FIGS. 5 and 6, any of the operations described in the elements may be performed programmatically (i.e., by a computer according to a computer program). In FIGS. 5 and 6, any of the operations described in the elements may be performed automatically (i.e., without user intervention).

Although the embodiments above have been described in detail, numerous variations and modifications will become apparent to those skilled in the art once the above disclosure is fully appreciated. It is intended that the following claims be interpreted to embrace all such variations and modifications.

What is claimed is:

1. A computer-implemented method, comprising:
performing, by a computer:
    partitioning a scene comprising a plurality of objects into a plurality of sub-regions, wherein the plurality of sub-regions are divided by a plurality of planes having orientations selected from a discrete set of orientations, wherein the discrete set of orientations comprises at least one spatial orientation that is not parallel to an x axis, a y axis, or a z axis and is at a nonzero angle with respect to the x axis, the y axis, or the z axis;
    storing the partitioned scene in a binary tree comprising a plurality of nodes, wherein each node of the plurality of nodes corresponds to one of the plurality of sub-regions, wherein the binary tree is stored in a memory of a computer system; and
    solving a ray tracing query for a ray, wherein solving the ray tracing query comprises traversing the binary tree to identify a first object of the plurality of objects intersected by the ray.

2. The method as recited in claim 1, wherein solving the ray tracing query for the ray further comprises:
    computing a plurality of values usable for solving the ray tracing query prior to traversing the binary tree, wherein computing the plurality of values comprises determining at least one inner product; and
    using the computed values while traversing the binary tree.

3. The method as recited in claim 1, wherein solving the ray tracing query for the ray further comprises:
    computing a reciprocal value prior to traversing the binary tree; and
    multiplying an axis of one of the plurality of planes by the reciprocal value while traversing the binary tree.

4. The method as recited in claim 1, further comprising:
    determining each orientation in the discrete set of orientations prior to partitioning the scene.

5. The method as recited in claim 4, wherein the orientations are determined based on a distribution of normals in the scene.

6. The method as recited in claim 1, wherein the discrete set of orientations comprises the x axis, the y axis, the z axis, and one or more orientations at a fixed angle with respect to the x axis, y axis, or z axis.

7. The method as recited in claim 1, wherein the sub-regions are either disjoint or overlapping.

8. The method as recited in claim 1, wherein the binary tree stores a plurality of leaf nodes and a plurality of non-leaf nodes, wherein each non-leaf node stores a location of the corresponding plane, an axis of the corresponding plane, and an offset to two child nodes.

9. A non-transitory, computer-readable storage medium, storing program instructions, wherein the program instructions are computer-executable to implement:
 partitioning a scene comprising a plurality of objects into a plurality of sub-regions, wherein the plurality of sub-regions are divided by a plurality of planes having orientations selected from a discrete set of orientations, wherein the discrete set of orientations comprises at least one spatial orientation that is not parallel to an x axis, a y axis, or a z axis and is at a nonzero angle with respect to the x axis, the y axis, or the z axis;
 storing the partitioned scene in a binary tree comprising a plurality of nodes, wherein each node of the plurality of nodes corresponds to one of the plurality of sub-regions; and
 solving a ray tracing query for a ray, wherein solving the ray tracing query comprises traversing the binary tree to identify a first object of the plurality of objects intersected by the ray.

10. The non-transitory, computer-readable storage medium as recited in claim 9, wherein solving the ray tracing query for the ray further comprises:
 computing a plurality of values usable for solving the ray tracing query prior to traversing the binary tree, wherein computing the plurality of values comprises determining at least one inner product; and
 using the computed values while traversing the binary tree.

11. The non-transitory, computer-readable storage medium as recited in claim 9, wherein solving the ray tracing query for the ray further comprises:
 computing a reciprocal value prior to traversing the binary tree; and
 multiplying an axis of one of the plurality of planes by the reciprocal value while traversing the binary tree.

12. The non-transitory, computer-readable storage medium as recited in claim 9, wherein the program instructions are computer-executable to implement:
 determining each orientation in the discrete set of orientations prior to partitioning the scene.

13. The non-transitory, computer-readable storage medium as recited in claim 12, wherein the orientations are determined based on a distribution of normals in the scene.

14. The non-transitory, computer-readable storage medium as recited in claim 9, wherein the discrete set of orientations comprises the x axis, the y axis, the z axis, and one or more orientations at a fixed angle with respect to the x axis, y axis, or z axis.

15. The non-transitory, computer-readable storage medium as recited in claim 9, wherein the sub-regions are either disjoint or overlapping.

16. A system, comprising:
 a processor; and
 a memory coupled to the processor, wherein the memory stores program instructions executable by the processor to:
  partition a scene comprising a plurality of objects into a plurality of sub-regions, wherein the plurality of sub-regions are divided by a plurality of planes having orientations selected from a discrete set of orientations, wherein the discrete set of orientations comprises at least one spatial orientation that is not parallel to an x axis, a y axis, or a z axis and is at a nonzero angle with respect to the x axis, the y axis, or the z axis;
  store the partitioned scene in a binary tree comprising a plurality of nodes, wherein each node of the plurality of nodes corresponds to one of the plurality of sub-regions; and
  solve a ray tracing query for a ray, wherein solving the ray tracing query comprises traversing the binary tree to identify a first object of the plurality of objects intersected by the ray.

17. The system as recited in claim 16, wherein, in solving the ray tracing query for the ray, the program instructions are executable by the processor to:
 compute a plurality of values usable for solving the ray tracing query prior to traversing the binary tree, wherein computing the plurality of values comprises determining at least one inner product; and
 use the computed values while traversing the binary tree.

18. The system as recited in claim 16, wherein, in solving the ray tracing query for the ray, the program instructions are executable by the processor to:
 compute a reciprocal value prior to traversing the binary tree; and
 multiply an axis of one of the plurality of planes by the reciprocal value while traversing the binary tree.

19. The system as recited in claim 16, wherein the program instructions are further executable by the processor to:
 determine each orientation in the discrete set of orientations prior to partitioning the scene.

20. The system as recited in claim 19, wherein the orientations are determined based on a distribution of normals in the scene.

21. The system as recited in claim 16, wherein the discrete set of orientations comprises the x axis, the y axis, the z axis, and one or more orientations at a fixed angle with respect to the x axis, y axis, or z axis.

22. The system as recited in claim 16, wherein the sub-regions are either disjoint or overlapping.

* * * * *